UNITED STATES PATENT OFFICE.

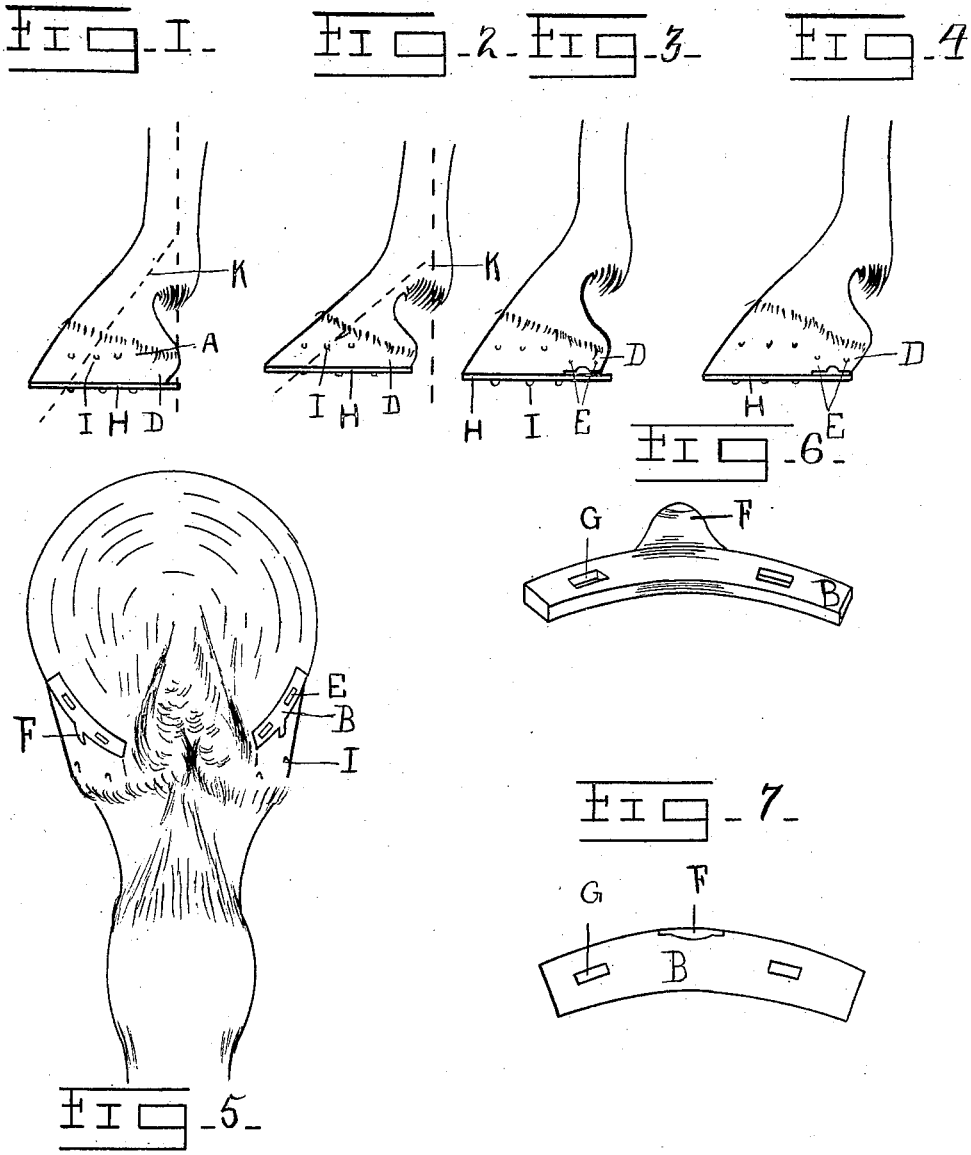

FREDERICK R. AHLERS, OF LAMOTTE, IOWA.

HOOF-PROTECTOR FOR ANIMALS.

No. 903,943.      Specification of Letters Patent.      Patented Nov. 17, 1908.

Application filed April 14, 1908. Serial No. 427,057.

*To all whom it may concern:*

Be it known that I, FREDERICK R. AHLERS, citizen of the United States, residing at Lamotte, in the county of Jackson and State of Iowa, have invented certain new and useful Improvements in Hoof-Protectors for Animals, of which the following is a specification.

It is well known that in shod horses the hoof at the rear quarters in contact with the shoe, is subjected to wear through friction with the shoe as a consequence of the expansion and contraction of the hoof at this part coincident with the alternate placing of weight on the hoof and release of the weight attendant upon travel. As a result of this undue wear at the heel of the hoof being proportionately greater than at the toe, the foot-axis viewed from the side becomes broken backward which subjects the hoof, the tendons, and ligaments to undue strain and alters the gait of the horse. This undue strain also favors diseased processes as corns, tendonitis, etc.

The object of my invention is to prevent this undue wear on the rear quarter of the hoof and thereby maintain the proper angle or relation of the foot-axis to the ground surface as long as the shoe remains on the foot.

It consists essentially in securing a metal plate to the hoof at the quarters and in some cases extending some little distance forward along the side wall of the hoof before the application of the shoe and thus prevent all wear on the hoof as the only wear is on the plate where it comes in contact with the shoe.

The following specification will point out in detail the mode of construction and use when taken in connection with the drawings accompanying the same and forming a part hereof.

Figure 1, is a perspective view taken from one side of a newly shod hoof, ankle and part of leg showing the angle of the foot-axis to the ground surface. Fig. 2, is a perspective view of Fig. 1, after the horse has been shod some time and the hoof has become worn, showing the angle of the foot-axis. Fig. 3, is a perspective view of a hoof with my protecting plate thereon when lately shod. Fig. 4, is a perspective view of the same hoof with my protecting plate thereon after the shoe has been worn for a long time. Fig. 5, is a plan view of the under side of the hoof with the plate secured to the hoof. Fig. 6, is a perspective view of the plate. Fig. 7, is a top or plan view of the plate.

Like characters of reference denote corresponding parts in each of the drawings.

Referring to the drawings A designates a hoof of a horse, B the protecting plate, which consists of a thin plate of steel or other metal bent horizontally to conform to the shape of the hoof at the back quarters D and provided with a thin lug F adapted to engage the side of the hoof and hold it in position. This lug or clip is not necessary in all cases. The plate B is then nailed to the bottom of the hoof at the back quarters D and side wall by nails E passing through the nail holes G and countersunk into the plate B. If the nail heads project below the plate they may be filed off till they are just flush with the lower surface of the plate so as to leave the lower surface of the plate B, smooth and flat in the same horizontal plane. The shoe H, is then fastened against the hoof in the usual manner by the nails I driven through the shoe and into the hoof and clenched upon each side forward of the plate B and the shoe covering said plate but wholly disconnected from the shoe.

In Fig. 1, is shown the angle of the foot-axis K to the ground surface in a newly shod horse's hoof and in Fig. 2, the foot-axis P after the shoe has been worn considerable time, by which it will be seen that the gait of the animal will be materially changed from the fact that the rear quarters D are lower down and this causes the shoe to come upon the ground at a different angle from that shown in Fig. 1.

It will be seen by my invention that what little wear there is at the rear quarters and side wall will be on the under surface of the plate and the contacting surface of the shoe and none upon the rear quarters D and side wall of the hoof and hence there will always be the same angle of the leg with relation to the ground surface. On this account the tendons and ligaments of the leg of the animal are subjected to no more strain during the latter portion of time a shoe is worn than at the first when a proper relation of the foot-axis to the ground has been established by fresh shoeing. It will also be observed in Fig. 4 that the hoof has grown longer so that the heel now projects beyond the shoe but the angle of the foot-axis to the ground has not been changed. By the use of this plate the heels are subjected to no more undue strain during the latter portion of the period the shoe is worn than at the first and hence the possibility of corns and kindred ailments of the foot is reduced to the minimum and the animal's gait is the same throughout the period the shoe is worn for the rear quarters are never worn so as to change the foot-axis with relation to the ground. Further the shoe is not liable to become loosened since its hoof surface is always in the same relation to the shoe surface of the hoof and this also would render it unnecessary to reset the shoe only when the shoe itself is to be repaired.

Having now described my invention what I claim and desire to secure by Letters Patent is:—

1. In a hoof protector for animals, a plate nailed to the bottom of the hoof on each side at the back quarters and the head of the nails flush with the lower side of the plate, and a shoe secure to the hoof and in frictional contact with the lower surface of the plate but wholly disconnected from the plate.

2. In a hoof protector for animals, a plate secured to the under side of the hoof on each side at the back quarters of the hoof and extending a short distance between the shoe and the hoof, but wholly disconnected from the shoe.

3. A hoof protector for animals consisting of plates secured to the base of the hoof at the back quarters between the shoe and the hoof and in the rear of the nails that hold the shoe to the hoof in contact with the shoe, but not connected to the shoe.

4. A hoof protector for animals consisting of a plate secured to the under side of the hoof at each back quarter and extending between the shoe and hoof for a short distance in contact with, but not connected to the shoe, and a lug secured to each plate extending up and engaging the side of the hoof at the back quarter.

5. In a hoof protector for animals and in combination with the hoof and shoe, a plate secured to the under side of the hoof of the animal against the back quarter of the hoof between the shoe and the hoof and in the rear of the nails that attach the shoe to the hoof but wholly disconnected from the shoe.

In testimony whereof I affix my signature, in presence of two witnesses.

FREDERICK R. AHLERS.

Witnesses:
 MATH WIRTZ,
 J. F. CAHILL.